United States Patent [19]

Gibbons et al.

[11] 4,219,845

[45] Aug. 26, 1980

[54] SENSE AND INJECT MOVING TARGET INDICATOR APPARATUS

[75] Inventors: Martin D. Gibbons, Camillus; Richard W. Aldrich, Liverpool, both of N.Y.

[73] Assignee: The United States of America as represented by the Secretary of the Air Force, Washington, D.C.

[21] Appl. No.: 29,585

[22] Filed: Apr. 12, 1979

[51] Int. Cl.² ............................................. H04N 3/14
[52] U.S. Cl. .................................. 358/105; 250/211 J; 357/24; 358/213
[58] Field of Search ...................... 358/105, 212, 213; 357/24; 250/211 J

[56] References Cited

U.S. PATENT DOCUMENTS

| | | | |
|---|---|---|---|
| 3,856,989 | 12/1974 | Weimer | 307/221 D |
| 3,904,818 | 9/1975 | Kovac | 358/213 |
| 4,064,533 | 12/1977 | Lampe et al. | 307/221 D |

Primary Examiner—Robert L. Richardson
Assistant Examiner—Joseph A. Orsino, Jr.
Attorney, Agent, or Firm—Joseph E. Rusz; William Stepanishen

[57] ABSTRACT

A moving target indicator apparatus utilizing charge injector device (CID) sensors to detect the presence or absence of a moving target. A signal from a possible target site in the sensor array is measured during a flow scan and is processed with the signal return from a second scan to determine absence or presence and direction.

5 Claims, 1 Drawing Figure

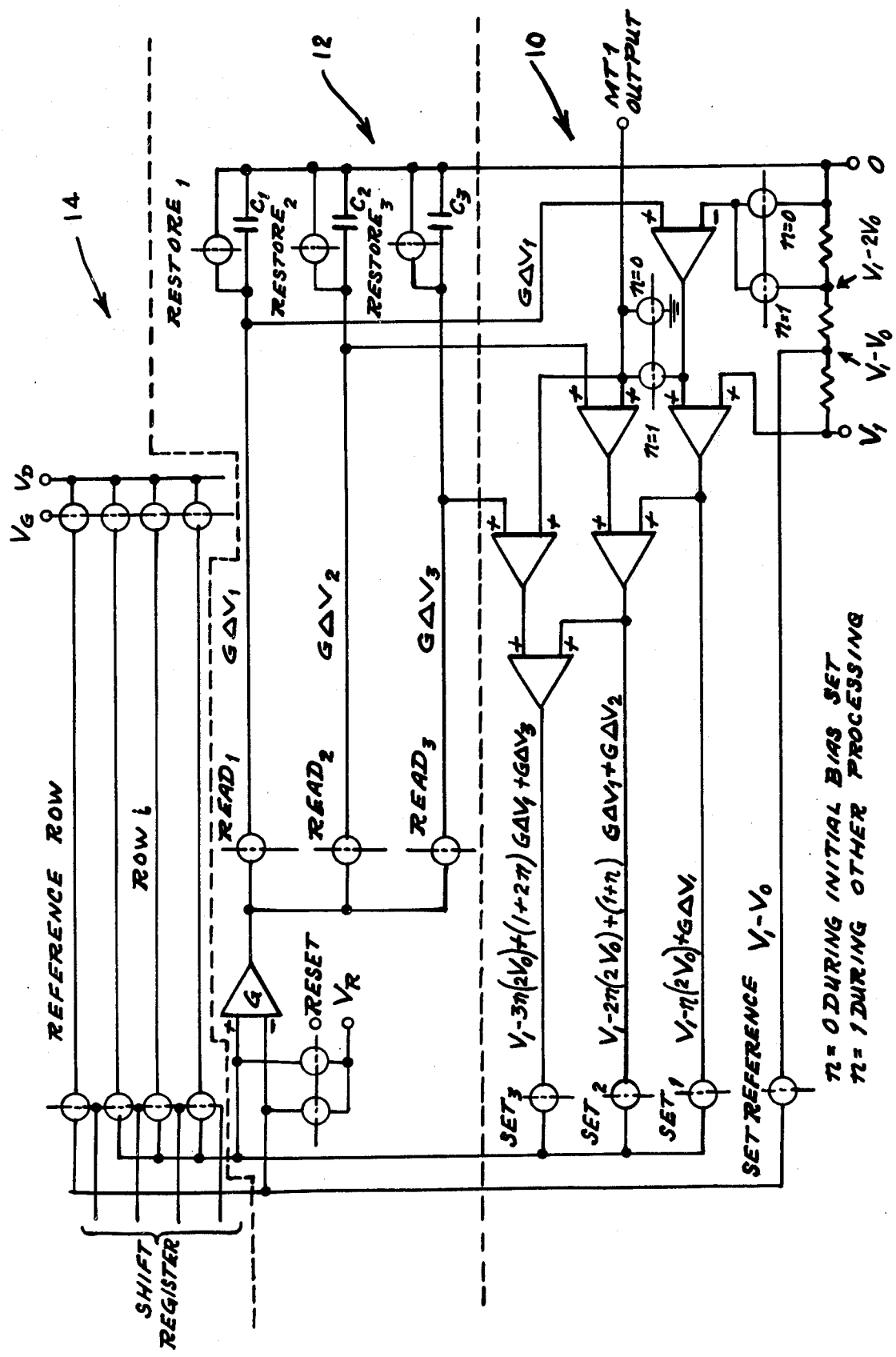

SENSE AND INJECT MOVING TARGET INDICATOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a moving target indicator apparatus, and in particular to a sense and inject moving target indicator apparatus.

In the prior art, the signl processing for moving target indicators (MTI) is remote or off chip with respect to the MTI unit. In the memory unit, the signal from each site in field one is stored, and then compared with the signals from field two. This method of signal processing requires a good deal of memory, especially if a large number of bits are required and utilized. The sense and inject method uses the sensing array itself as the memory. With this method it is possible to use MTI cells of special design in which the charge from the first field is collected and stored in an adjacent storage pad. After the second field charge is collected, the two charge packets may be differentially compared. Although the use of the MTI cell in this manner looks attractive in principle, the fabrication of an array of such cells would be extremely difficult and costly. The present sense and inject apparatus accomplishes the same on-chip storage with a conventional CID cell and does not require difficult fabrication processes.

SUMMARY OF THE INVENTION

The present invention utilizes a sense and inject moving target indicator (MTI) apparatus in conjunction with charge injector device (CID) sensors which is capable of yielding a signal that is the difference between the charge collected during the first and second fields. The sense and inject apparatus measures the signal at a site after the first field, and re-introduces the complement of the field one signal, by injecting twice the charge collected in the first field from a reference charge in the site. After integrating for the second field, the combined signal is measured. If the charge collected during the two fields is the same, the net signal is zero. If different, the signal will be positive or negative depending upon whether the target moves into or out of the site.

It is one object of the present invention, therefore, to provide a new and improved sense and inject moving target indicator apparatus.

It is another object of the invention to provide a new and improved sense and inject moving target indicator apparatus utilzing charge injector device sensors to determine a moving target presence or absence.

It is still another object of the invention to provide a new and improved sense and inject moving target indicator apparatus wherein the signal and twice its complement are combined with a second signal to provide a moving target indication.

It is yet another object of the invention to provide a new and improved sense and inject moving target indicator apparatus which is economical to produce and utilizes currently available components that lend themselves to standard mass production manufacturing techniques.

These and other advantages, objects and features of the invention will become more apparent after considering the following description taken in conjunction with the illustrative embodiment in the accompanying drawings.

BRIEF DESCRIPTION OF THE DRAWINGS

The FIGURE is a block diagram of the sense and inject moving target indicator apparatus according to the present invention.

DESCRIPTION OF THE PREFERRED EMBODIMENT

Referring now to the FIGURE there is shown a sense and inject moving target indicator apparatus wherein the inject unit 10 is connected to the CID (charge injector device) array 14 which in turn is shown connected to the sense unit 12. The inject unit 10 comprises a plurality of adder and difference units which are arranged to provide the voltage potentials shown on the respective output lines labelled set 1, 2 and 3. The CID array 14 is represented by a plurality of lines in which the sensor units (not shown) are arranged to form a matrix. The CID array 14 includes a reference row and a transistor gate for each of the plurality of sensor lines. The transistor gates are connected to a shift register (not shown). The sense unit 12 is connected to receive signals from the reference row which may be read differentially with any one selected sensor row of the CID array unit 14.

The operation of the present apparatus will be more fully understood and explained in the following example. The present apparatus is called the sense and inject apparatus because the storage is accomplished by injecting at each CID array site a charge that is twice the first field charge at the site. After second field integration, the detected signal will be zero at the site if the optical signal has been invariant during the two fields. The present sense and inject MTI (memory target indicator) apparatus requires an opaque reference row such that each active row may be compared differentially with the opaque row in order to obtain cancellation of any fixed pattern noise which may be introduced by feedthrough of the column drive pulses. However, in order to be able to inject a charge which is equivalent to the first field signal, a large bias charge must be present in all the sites on the CID array. The amount of signal injected depends upon the specific site capacitance which may vary due to site area and oxide variation. A voltage applied to the column drives may inject different amounts of charge from each site and thus, these variations will introduce an uncertainty into the stored signal charge. However, this uncertainty can be reduced by rereading the stored charge and adjusting the stored charge by successive injections. The corrected sense and inject apparatus operates on the principle that a charge packet can be sensed more accurately than it can be set. It is believed that two corrections are needed to restore the field one signal charge. Furthermore, the initial bias charge must be set accurately and it therefore, requires two corrections. The wells in the CID array would be filled by flashing a light at the beginning of the cycle. Since there is no simple way of adding charge after the initial light flash, it is necessary to approach the desired bias charge levels by injecting increments of charge, being careful not to overshoot the desired charge level. As a result, the initial injection must always be less than the desired level by the expected uncertainty due to capacitance variations. Thus, it may be clearly understood that the present apparatus is based upon the premise that it is possible to read, non-destructively, and with high precision the difference in the voltages on two lines, one a reference row and the other a selected row from the imaging array. This difference voltage may then be used to correct the charge on the selected row to make it read the same as the charge on the reference row. The reason for the use of a reference row, rather than a simple reference voltage, is to achieve the advantages demonstrated by differential readouts in rejecting electrical interference signals that are coupled into the rows. The present apparatus operates in the specific manner set forth by performing the following steps:

(1) All wells are filled (a light is flashed).
(2) Charge is set in a reference row by injecting to a voltage $V_1-V_o$.
(3) Charge is set in the selected row by injecting to voltage $V_1$. $V_o$ is selected so that, at every array site, the charge will exceed the charge at any site in the reference row. This is required because the array charge will be adjusted to be equal to the reference charge in the same column and it is only possible to reduce charge.
(4) The reference row and selected row are read out differentially.
(5) As each column site is read, the differential voltage is observed, multiplied by a gain factor, and an approximately equivalent charge is injected from the selected site. Since an injection voltage $\Delta V$ results in a charge change $\Delta Q = C\Delta V$, and this results in a change in output voltage of approximately $\delta V = \Delta Q / C_{output}$, it is clear that the gain should be approximately $\Delta V / \delta V = C_{out}/C$, where C is the site capacitance.
(6) After such a correction the differential voltage is read again and, if necessary, a second correction can be made. It is obviously essential to have remembered the first correction since charge is injected only by successively decreasing the gate voltage. Thus, the nth injection voltage is $$V_n = V_1 + \Delta V_1 + \Delta V_2 - + \Delta V_{n-1}$$

where the $\Delta V$ are calculated from the readout differential voltages. It is believed that two corrections are required to achieve 100 electron accuracy.
(7) Having established reproducible bias charges through the array (all the charges in a column will be equal to the reference charge in that column), the array is allowed to integrate the first field.
(8) The array is read out, site by site. For each site the differential output voltage (the first field signal) is temporarily stored.
(9) A correction to the injection voltage (again $G\delta V_1$) is generated and the first attempt to set $Q_R - Q_1$ is made by injecting to $V_1 + G\delta V_1$. It turns out, however, that some of the charge will be inaccessible unless a d-c offset voltage is also included. This should be about $2 \times V_o$. Thus the first injection voltage, after field 1, is $V_1 - 2V_o + G\delta V_1$; wherein $V_1$ and $V_o$ are negative in P-channel devices.

(10) The reference row and selected row are read differentially, yielding some residual voltage, presumably negative (i.e., there will be less charge in the selected row than in the reference row). This is multiplied by the gain and added to $-2V_o + G\delta V$. The net will be further added to yield the next injection voltage:

$$V_1 - 2V_o + G\delta V_1 + (-2V_o + G\delta V_1 + G\delta V_2).$$

(11) A further iteration may be necessary.
(12) The second field is integrated.
(13) The array is read out in a normal manner and the bias voltage $2V_o$ subtracted. Only the difference charge $-Q_1 + Q_2$ results in an output signal.

Although the invention has been described with reference to a particular embodiment, it will be understood to those skilled in the art that the invention is capable of a variety of alternative embodiments within the spirit and scope of the appended claims.

What is claimed is:

1. A sense and inject moving target indicator apparatus comprising in combination:

means for injecting a charge, said charge injecting means having a set reference line and a plurality of set lines, said set reference line having a predetermined charge level thereon, said charge level being variable, each of said plurality of set lines having a controllable, progressively smaller charge level thereon, said set reference line charge level being larger than the charge levels available to each of said plurality of set lines, each of said plurality of set lines being individually selectable, each of said plurality of set lines being connected in common to an output line, a CID array having a plurality of sensor rows therein, one of said plurality of sensor rows being designated a reference row, any one of the remaining rows of said plurality of sensor rows being designated a selected row, each of said plurality of sensor rows being individually selectable, said reference row being connected to said set reference line, said remaining rows of said plurality of sensor rows being connected in common to said output line, and, a charge sensing means having a first and second input line, said first input line being connected to said reference row and said reference set line, said second input line being connected to said common line, said charge sensing means differentially sensing the charge applied to said first and second input line, said charge injecting means injecting a reference charge into said reference row, said CID array being charged by a light flash, said charge injecting means injecting said selected row with a first charge, said first charge having a greater level than said reference charge, said charge sensing means differentially reading out the charge in said reference row and selected row, said charge sensing means providing a differential voltage in response to said differential read out, said charge sensing means multiplying said differential voltage signal by a gain factor to provide a correction signal, said correction signal being applied to said charge injecting means, said charge injecting means applying said correction signal to said selected row, said charge sensing means differentially reading out said reference row and selected row to yield a first field signal, said first field signal providing the response to whether or not a moving target indication is present.

2. A sense and inject moving target indicator apparatus as described in claim 1 further including a second correction signal being provided by said charge sensing means, said charge sensing means thus providing a double charge correction.

3. A sense and inject moving target indicator apparatus as described in claim 1 wherein said plurality of set lines equals three.

4. A sense and inject moving target indicator apparatus as described in claim 1 wherein said charge in said reference line is determined by $V_1-V_{o1}$ where $V_1$ is the injection voltage applied to the array elements and $V_o$ is chosen such that any reference line site will contain less bias charge than any array site and $V_1$ and $V_o$ are both negative in P-channel devices.

5. A sense and inject moving target indicator apparatus as described in claim 2 wherein a second field is generated, said second field being integrated in said CID array, said CID array then being readout to provide a moving target indication.

* * * * *